F. E. RICKETTS.
REGULATOR.
APPLICATION FILED MAY 26, 1909.

1,021,333.

Patented Mar. 26, 1912.
4 SHEETS—SHEET 1.

Witnesses
Inventor
Forrest E. Ricketts.
By C. A. Snow & Co.
Attorneys

F. E. RICKETTS.
REGULATOR.
APPLICATION FILED MAY 26, 1909.

1,021,333.

Patented Mar. 26, 1912.
4 SHEETS—SHEET 3.

Witnesses

Inventor
Forrest E. Ricketts.
By C. A. Snow & Co.
Attorneys

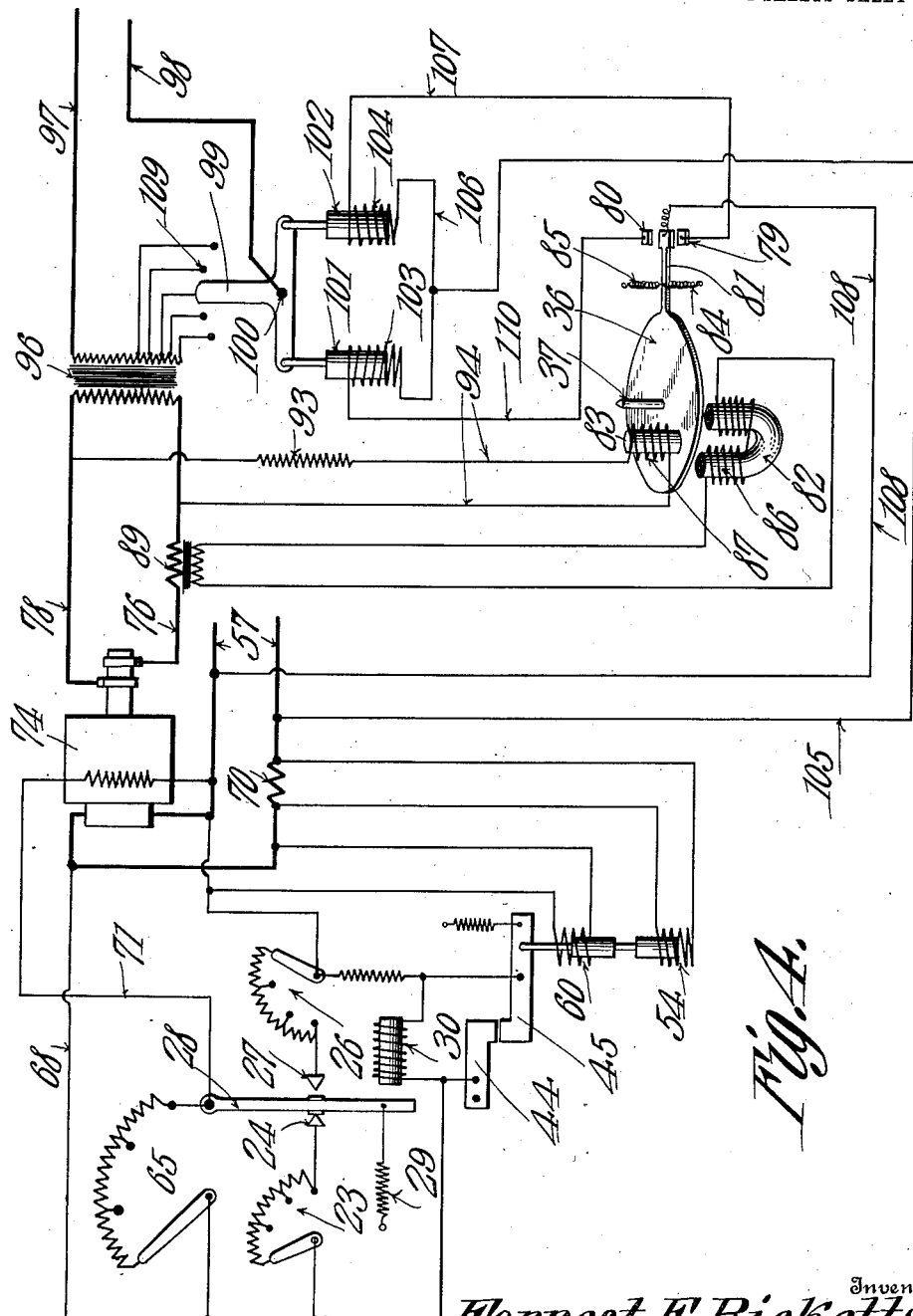

UNITED STATES PATENT OFFICE.

FORREST E. RICKETTS, OF BALTIMORE, MARYLAND.

REGULATOR.

1,021,333. Specification of Letters Patent. Patented Mar. 26, 1912.

Application filed May 26, 1909. Serial No. 498,384.

*To all whom it may concern:*

Be it known that I, FORREST E. RICKETTS, a citizen of the United States, residing at Baltimore, in the State of Maryland, have invented a new and useful Regulator, of which the following is a specification.

This invention has reference to improvements in regulators and more especially for an automatic field circuit regulator for electric generators.

The object of the present invention is to provide a regulator adapted to vary the current in the field circuit of a generator to compensate for changes in the armature circuit.

In accordance with the present invention means are provided for receiving current from or delivering current to the field coils in accordance with the requirements of the armature circuit.

In the preferred embodiment of the invention an exciter is placed in parallel relation to the field circuit of the generator and means are provided for varying the field current of the exciter whereby it is caused to receive current from or deliver current to that portion of the generator field which is in parallel relation to the armature circuit of the exciter, the direction and intensity of the current in the exciter armature being controlled by means of its field, in which field the current is varied in response to variations in the armature of the generator.

Figure 1:
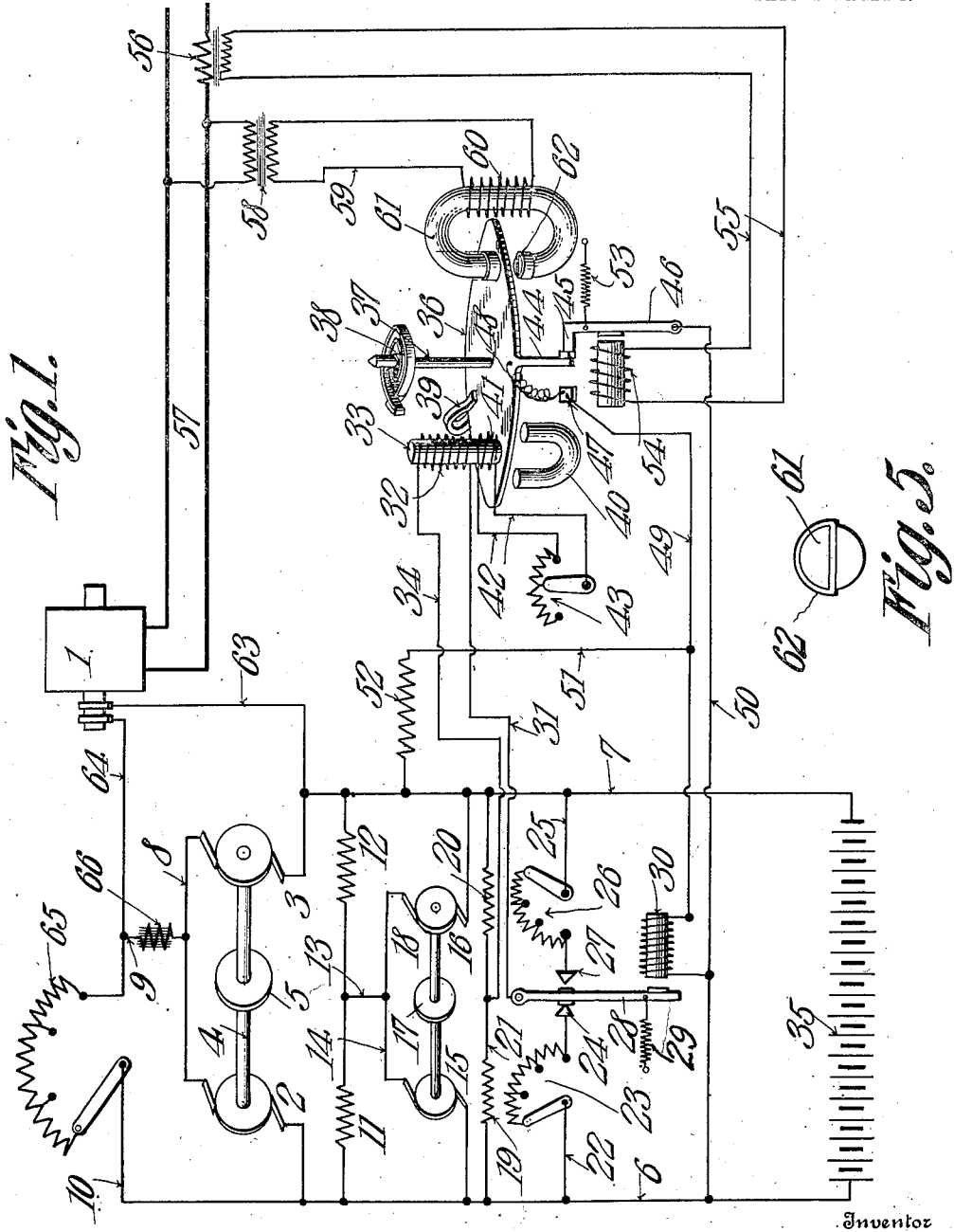
Figure 2:
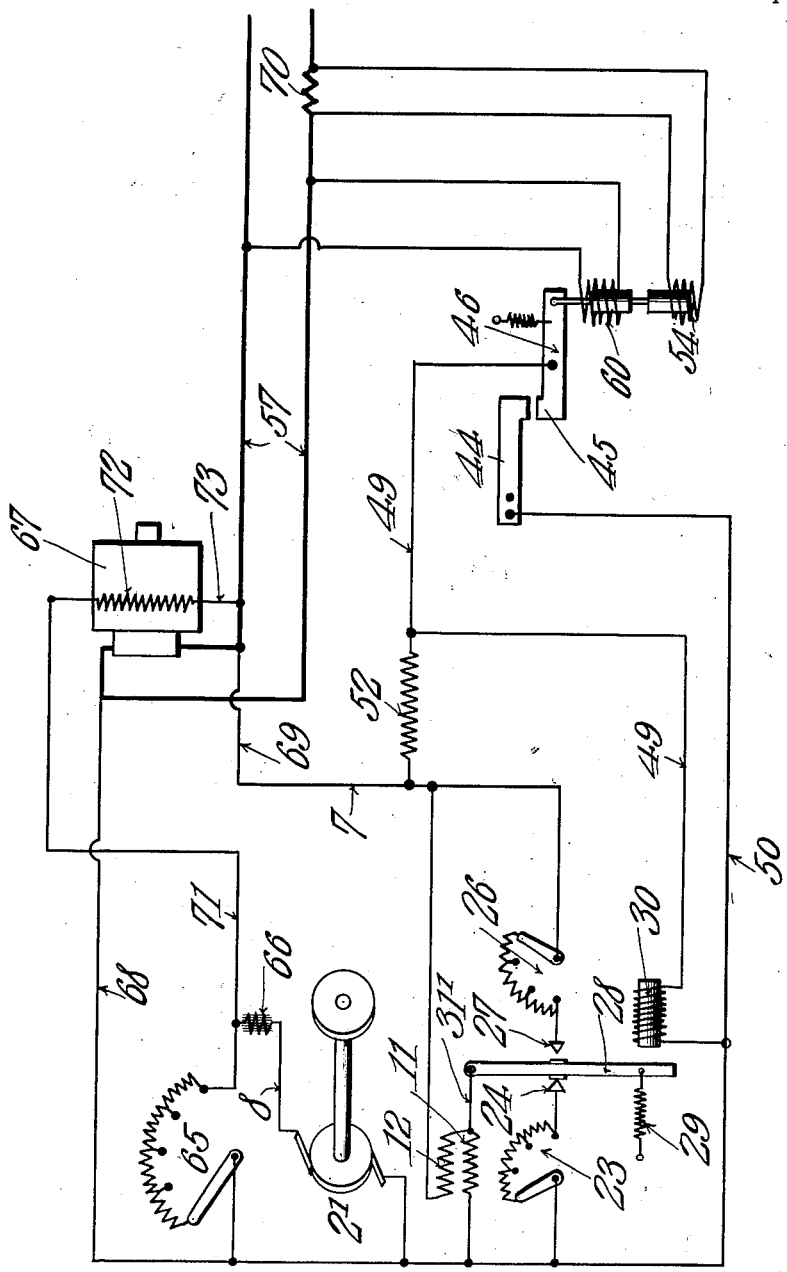
Figure 3:
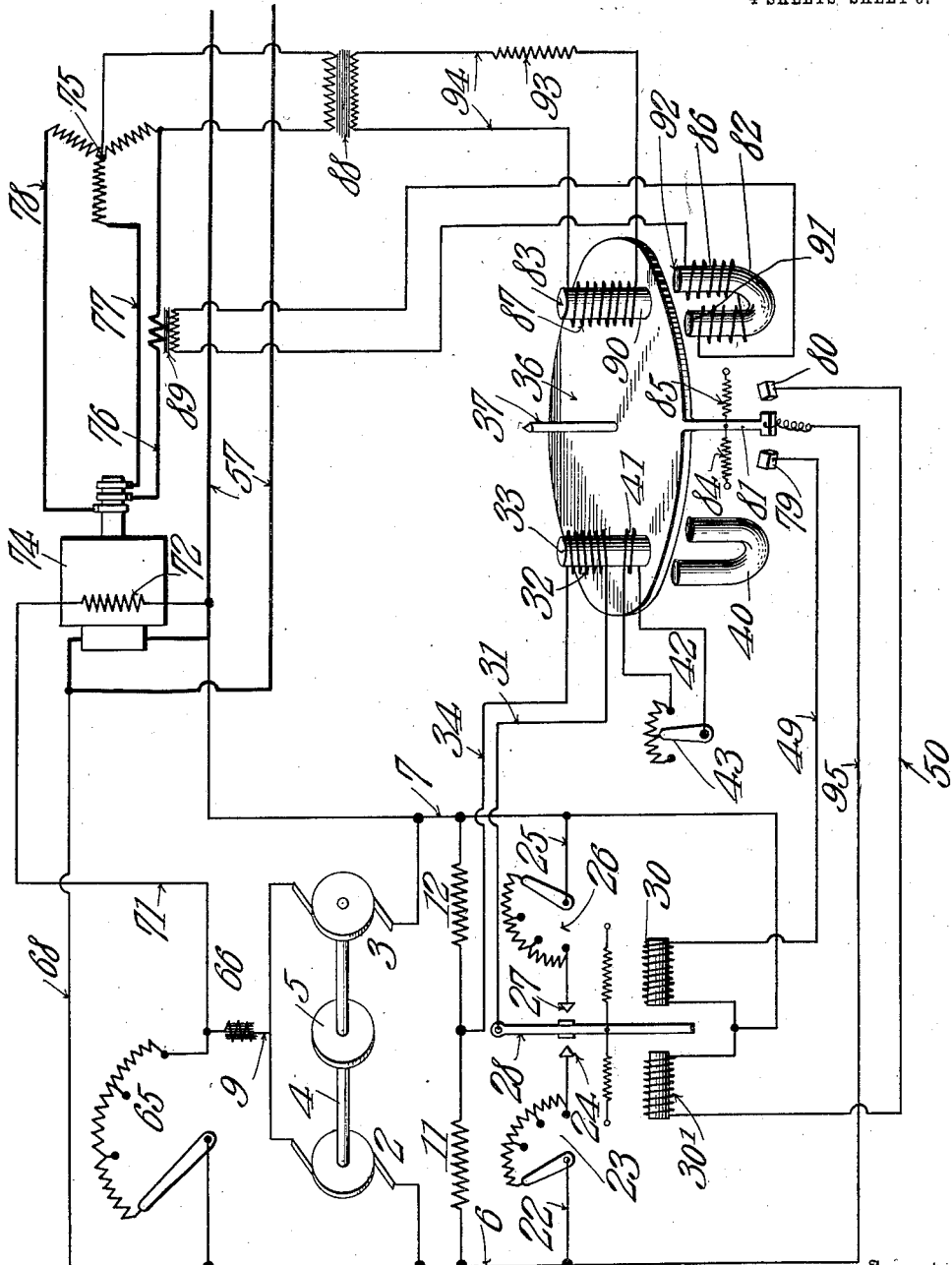

The invention will be best understood from a consideration of the following detail description taken in connection with the accompanying drawings forming a part of this specification, in which drawings, Figure 1 is a diagram showing a generator and circuit connections therewith, together with means for controlling the voltage in the circuit in accordance with the present invention when the main exciter is supplemented by a battery. Fig. 2 is a diagram showing an application of the invention wherein the generator is self-exciting and the regulating exciter is a two-wire dynamo having a single armature in the magnetic influence of two fields wound so as to oppose each other. Fig. 3 is a diagram showing a rotary converter and circuit connections therewith, together with means for controlling the phase relation of the voltage and the current in the circuit in accordance with the present invention. Fig. 4 is a diagram showing a rotary converter and circuit connections therewith, and means for controlling the voltage of the circuit by varying the phase relation of the current and voltage supplied to the rotor and means for restoring the phase relation of the current and voltage.

Referring first to Fig. 1 there is shown a generator 1 which is assumed to be driven by power supplied from any convenient source and furthermore, is assumed to have a rotating field and a stationary armature. The field current is furnished, in the system illustrated in Fig. 1, by means of a current source consisting of a three-wire dynamo comprising two simple dynamos 2 and 3 mechanically connected for synchronous rotation by a shaft 4 upon which is shown a pulley 5 which may be taken as typical of any means for rotating the armatures of the dynamos 2 and 3. Exciter mains are indicated at 6 and 7 respectively and the dynamos 2 and 3 have a common connection 8 which, in turn, is connected to an intermediate point of the field circuit to be regulated by a conductor 9. The other side of the dynamo 2 is connected to the exciter main 6 while the other side of the dynamo 3 is connected to the exciter main 7. Thus the dynamo 2 is connected in parallel relation to the inactive part of the field circuit to be regulated and the dynamo 3 is connected to the active part of the field circuit of the generator 1. The dynamo 2 has field coils 11 and the dynamo 3 has field coils 12 connected on one side to the exciter mains 6 and 7 respectively and in series relation one to the other while their common connection is in turn connected by means of conductor 13 to another conductor 14 which is the common connection of an auxiliary three-wire exciter comprising dynamos 15 and 16 electrically connected in series across the exciter mains 6 and 7 and having their rotors mechanically connected to a source of power represented by a pulley 17 by means of a common shaft 18. The dynamos 15 and 16 have respective field coils 19 and 20 connected in series one with the other and across the exciter mains 6 and 7, the connection between the coils 19 and 20 being by way of a conductor 21.

Connected to the exciter main 6 is a conductor 22 including an adjustable rheostat 23 and ending at a terminal 24. Connected to the exciter main 7 is another conductor 25 including an adjustable rheostat 26 and ending at a terminal 27. The terminals 24 and 27 are arranged on opposite sides of a movable armature 28 which latter is adapted to complete a circuit to either terminal 24 or 27 but not both at once. The armature 28 is under the normal control of a spring 29 tending to maintain the armature in contact with the terminal 24. In inductive relation to the armature 28 is an electromagnet 30 acting on the armature in opposition to the spring 29 and when the magnet 30 is energized then the armature 28 is attracted to it against the action of the spring 29 and the armature is brought into electrical connection with the terminal 27. The armature 28 is connected by a conductor 31 to one terminal of the coil 32 of an electromagnet 33, the other side of which coil is connected by a conductor 34 to the common conductor 21 of the field coils 19 and 20.

The exciter mains 6 and 7 are charged by a battery 35, but this battery is not mandatory and may be omitted.

There is also provided a rotatable disk 36 of non-magnetic metal, preferably aluminum and this disk is mounted on a shaft 37 which is assumed to be supported in suitable bearings. The disk 37 is under the normal control of a spiral spring 38 tending to rotate the disk in one direction. There is also provided a horse-shoe magnet 39 having its polar ends in inductive relation to the disk each on a respective face thereof and equi-distantly disposed from the axis of the disk. The magnet 39 prevents continued oscillations of the disk 36 when the latter is set in motion. There is also a horse-shoe magnet 40 having its polar ends in inductive relation to the disk 36 on one face only thereof and these polar ends are equi-distantly disposed from the axis of the disk, while the magnet 33 is in inductive relation to the other face of the disk 36 at a point midway between the polar ends of the magnet 40, the magnet 33 being of the bar type and having one polar extremity only adjacent to the face of the disk 36.

In addition to the coil 32 the magnet 33 is wound with another coil 41 having its two terminals connected by conductors 42 to the switch arm and resistances respectively of an adjustable rheostat 43.

The disk 36 carries a radial contact arm 44 in the path of which on one side thereof is a pivoted contact terminal 45 being on the free end of an armature lever 46, and in the path of the contact arm 44 on the side remote from the contact terminal 45 there is a back stop 47 connected by a flexible conductor 48 to the disk 36 and by a conductor 49 to one side of the coil of the magnet 30 the other side of which coil is connected by a conductor 50 to the armature lever 46 and also the exciter main 6. The conductor 49 at a point between the disk 36 and the magnet 30 is connected by a conductor 51 through a resistance 52 to the exciter main 7, this conductor being shown in the diagram as joined to the main 7 between the connections of the field 12 and armature of the dynamo 16. The armature lever 46 is under the normal control of a spring 53 and is also within the field of an electromagnet 54 tending to move the armature 46 in opposition to the spring 53. The magnet 54 has its winding connected by conductors 55 to the opposite sides of the secondary winding of a transformer 56, the primary winding of which is included in series in one of the mains 57 of the armature of the generator 1. Branched across the mains 57 is the primary winding of another transformer 58, the secondary winding of which is connected by mains 59 to the terminals of a coil 60 of a horse-shoe magnet 61 having its polar extremities brought into close relation to opposite faces of the disk 36, these polar extremities being in line one with the other. The polar extremities of the magnet 61 are each formed with a diametric slot in which is seated a diametric portion of a band 62 half encircling said polar extremity. The band 62 constitutes a single turn closed circuit and is made of non-magnetic metal.

The field of the generator 1 is connected on one side by a conductor 63 to the exciter main 7 and on the other side by a conductor 64 to the exciter main 6, the said conductor 64 including an adjustable resistance 65. The conductor 9 is connected to the conductor 64 and includes an inductive resistance 66 to prevent a too sudden change in the intensity of the current flowing between the conductors 8 and 64.

Let it be assumed that the conductor 6 is connected to the positive side of the battery 35 and that the conductor 7 is connected to the negative side of said battery, then current will flow by way of the conductor 6 through the regulating resistance 65 and conductor 64 to the field coils of the generator 1 and returning by way of the conductor 63 and conductor or main 7 to the negative terminal of the battery thus producing in the generator field a magnetism which is in proportion to the amount of current flowing through the field coils. The voltage in the armature circuit is controlled by the magnetism of the field and is therefore proportional to the current flowing in the field coil. Since the resistance of the field coils is constant current flowing through them will be in proportion to the voltage across the coils which will always be equal to the voltage across the exciter mains less the voltage across the regulating resistance 65 in series with the field coil and hence the voltage across the field coils will vary inversely as the voltage across the regulating resistance.

The dynamos 2 and 3 when driven at constant speed will supply current to or receive current from the portion of the field circuit to which they are connected, depending upon the relative strength of their respective fields. If the field 11 is of sufficient strength to cause the armature of the dynamo 2 to generate a voltage greater than the normal drop across the portion of the field circuit to which it is connected this dynamo will furnish sufficient current to that portion of the circuit to equalize their voltages, but if the strength of the field 11 is not sufficient to cause the armature of the dynamo 2 to generate a voltage equal to the normal drop across the portion of the field circuit to which it is connected, then the armature will receive current from that portion of the field circuit, which will cause the dynamo 2 to run as a motor and deliver power to the shaft 4. A similar variation of the field circuit of the dynamo 3 will produce a similar effect on the armature of that dynamo causing it to supply current to the portion of the field circuit to which it is connected when the field 12 is above normal and receive current from that portion of the field circuit and deliver power to the shaft 4 when the current in the field 12 is below normal. Thus it will be seen that if both the dynamos 2 and 3 are working above normal voltage the sum of their voltages will be greater than that of the battery and they will receive power from the shaft 4 and furnish current to the exciter mains 6 and 7, though the amount of current furnished by each of them may not be the same and therefore their effect on the field circuit of the generator is then the same as though one of them were working below normal. Hence the activity of one part of the field circuit will be increased or decreased relative to the other. Since however the dynamos 2 and 3 are each capable of receiving power from or delivering power to the shaft 4 depending upon the relative strength of their respective fields, it is evident that if means are provided for varying the strengths of these fields one of the dynamos may be made to furnish power to the shaft and thereby drive the other as a generator. The source of power typified by the pulley 5 may be omitted when the dynamos 2 and 3 are not to be used to furnish current to the exciter mains 6 and 7 but simply to transfer power from the active part to the inactive part of the field circuit and vice versa according to the relative strength of the fields 11 and 12. It is also evident that either of the dynamos 2 and 3 may be omitted and the remaining one will receive current from the portion of the field circuit to which it is connected and deliver power to the shaft 4 or receive power from the shaft 4 and deliver current to the respective portion of the field circuit, this depending upon the field strength of the remaining dynamo.

The strength of the fields 11 and 12 is controlled by means of the auxiliary exciter composed of the dynamos 15 and 16 driven by the power source typified by the pulley 17, these dynamos being adapted to receive power from the shaft 18 and deliver current to the field 11 when the strength of the field 19 is above normal and receive current from the field 11 and deliver power to the shaft 18 when the field 19 is below normal. The dynamo 16 will likewise receive power from the shaft and deliver current to the field 12 when the strength of the field 20 is above normal and receive current from the field 12 and deliver power to the shaft when the field 20 is below normal. The fields 19 and 20 are controlled by means of the armature lever 28 which is adapted to short circuit the field 19 through the resistance 23 when the pull of the spring 29 becomes greater than that of the magnet 30 and the field 20 through the resistance 26 when the pull of the magnet overcomes the spring.

When the contacts 44 and 45 are in engagement then there is established a circuit from the exciter main 6 by way of the conductor 50 to the contacts 44 and 45 and disk 36 to the conductor 48 and back stop 47 to the conductors 49 and 51 and through the resistance 52 to the other exciter main 7, the magnet 30 being thereby short circuited. When the circuit is broken between the contacts 44 and 45 then there is established a circuit from the exciter main 6 through the conductor 50 to the coil of the magnet 30 thence by way of the conductors 49 and 51 and resistance 52 to the other exciter main 7 and the magnet 30 thereby becomes energized and the armature lever 28 is attracted against the action of the spring 29 until circuit is made at the terminal 27. The core of the magnet 30 is made of soft iron so as to quickly de-magnetize and release the armature lever 28 when this magnet is short circuited.

The contacts 44 and 45 are controlled by the magnet 54 acting on the armature lever 46 and the magnet 61 acting on the disk 36 respectively, and these magnets are energized by the transformers 56 and 58 responsive to the current and voltage elements of the system to be regulated. These magnets are so placed that their fields are remote one from the other. This arrangement, for a given adjustment of the springs 38 and 53 will require the current in the coil 60, necessary to cause the separation of the contacts 44 and 45, to vary with the currents in the magnet coil 54. Since the current in the coil 60 varies with the voltage in the armature circuit of the generator and the current in the coil of the magnet 54 varies as the current in the armature circuit of the generator, for a given current flowing in said armature circuit, it will require a certain voltage in the armature circuit to cause the separation of the contacts 44 and 45. Therefore if means controlled by these contacts are provided for maintaining the voltage in the armature circuit of the generator just sufficient to bring the contacts to the point of contact, this voltage will be in proportion to the current flowing in the armature circuit regardless of the power factor.

The current supplied to the coil 60 being alternating in character will produce a magnetic flux in the magnet 61 which is constantly changing in direction. This variation of flux will induce a current in the conductors 62 at the polar extremities of the magnet 61 which will tend to delay the magnetism of that portion of the polar extremities embraced by these conductors. This magnetic flux will also induce a current in the disk 36 through which the flux passes. This induced current will lag behind the magnetism of the magnet 61 and will produce a magnetic pole on either side of the disk which will be unlike the magnetic pole of the magnet 61. There will be a mutual attraction between the poles on the disk and the embraced poles and the disk will tend to rotate toward the embraced portion of the poles, which in the system illustrated in Fig. 1 will move the contact 44 away from the contact 45.

The magnet 40 is permanently magnetized in such manner that its poles are unlike. The coil 32 of the magnet 33 receives current from a direct current circuit, the polarity of which is controlled by the rotation of the disk 36. This current is supplied in the system illustrated by the armature 28 but may be supplied by any of the circuits, the current value of which approaches zero value periodically.

The coil 41 is in inductive relation to the core of the magnet 33 and is included in the circuit having the adjustable resistance 43, the function of this coil 41 being to vary the lag of magnetism in the magnet 33.

Since the voltage supplied to the coil 32 is periodically approaching zero, the magnetism of the magnet 33 is also periodically approaching zero. The variation of this magnetism generates a current in the disk 36 which in turn produces a resultant magnetism generating a pole on the surface of the disk near the adjacent pole of the magnet 33 which is unlike that pole, and also a pole on the opposite side of the disk which is like the said pole. These resultant poles lag behind the magnetism of the magnet 33 and as the poles of the magnet 40 have a constant value and are unlike, one of the poles of the magnet 40 will attract and the other will repel the resultant pole on the surface of the disk, thereby tending to turn the disk in one sense when the magnetism of the magnet 33 passes through zero after having been magnetized in one direction, and tending to turn the disk in the other sense when the magnetism of the magnet 33 passes through zero after having been magnetized in the other direction. Therefore the magnet coil 33 may be so connected to the armature 28 that the disk 36 will receive an impulse in a direction to open the contacts 44 and 45 when the direction of current in the armature 28 changes from negative to positive, and in the direction to close these contacts, when the direction of the current in the armature 28 changes from positive to negative. By varying the lag of magnetism in the magnet 33 by suitably varying the resistance 43 the impulses imparted to the disk may be varied as to time relative to the time of zero current in the armature 28.

In response to an increase of voltage in the armature circuit of the generator 1 in the system shown in Fig. 1, a greater voltage will be induced in the secondary of the transformer 58 which will increase the current flowing in the coil 60 and this will tend to rotate the disk 36 against the tension of the spring 38 and separate the contacts 44 and 45. This will cause the energization of the magnet 30 in the manner before described and cause it to attract the armature 28 and thus bring the latter into electrical connection with the contact 27. This will allow a part of the current which flows from the positive exciter main 6 to the field coil 19 to be shunted around the field coil 20, by way of the conductor 34, coil 32, conductor 31, the armature 28, contact 27 and resistance 26 to the negative exciter main, thereby decreasing the strength of the field coil 20 below normal. This current in passing through the coil 32 will vary the magnetism of the magnet 33 so as to give an impulse to the disk 36 just sufficient to overcome the inertia of the moving element and in the direction to close the contacts 44 and 45. But since the resistance of the field coil 20 and the resistance 26 in parallel is less than the resistance of the field coil 20, the resistance in series with the field coil 19 will be less, and more current will flow through the field coil 19 thereby exciting it above normal. But the voltage of the armature circuit of the dynamos 15 and 16 are in proportion to the strength of their respective fields and therefore the voltage of the armature of the dynamo 15 will be above normal and that of the armature of the dynamo 16 will be below normal, and the armature of the dynamo 15 being in parallel with the field coil 11 their voltages will be equal. And the armature of the dynamo 16 being in parallel with the field coil 12 their voltages will also be equal. Therefore the strength of the field coil 11 will be above normal and the strength of the field coil 12 will be below normal.

The voltage of the armature of the dynamo 2 is in proportion to the strength of its field 11 and the voltage of the armature of the dynamo 3 is in proportion to the strength of its field coil 12, therefore the voltage of the armature of the dynamo 2 is above normal and the voltage of the armature of the dynamo 3 is below normal. The resistance 65 in the inactive part of the field circuit being in parallel with the armature of the dynamo 2, but having a lower voltage, will receive current from the dynamo 2 and the voltage of the resistance 65 will rise above normal. But the coils of the generator or the active part of the field circuit being in parallel with the armature of the dynamo 3, but having a higher voltage, will supply current to the armature of the dynamo 3, and the voltage of the field coils of the generator will drop below normal, thereby reducing the current flowing through the said field coils. The voltage in the armature circuit of the generator being in proportion to the current flowing in its field coils will be reduced, and the current flowing from the secondary of the transformer 58 to the solenoid 60 will be reduced, and the magnetism of the magnet 61 will decrease and allow the spring 38 to rotate the disk against the pull of the magnet 61 and bring the contacts 44 and 45 together, thus short-circuiting and thereby deënergizing the magnet 30 and this will allow the spring 29 to pull the armature 28 into electrical connection with the contact 24 forming a shunt circuit for a part of the current around the field coil 19 by way of the resistance 23 and armature 28, conductor 31, coil 32 and conductor 34 to conductors 21. The current flowing through the coil 32 will change the magnetism of the magnet 33 so as to give an impulse to the disk 36 just sufficient to overcome the inertia of the moving element and in a direction to separate the contacts 44 and 45. But the contact 27 being cut out the resistance between the armature 28 and the negative exciter main 7 is increased, therefore the current in the field coil 19 is decreased for two reasons, first by having the resistance 23 in parallel with it and, second, by having more resistance in series with it. The field 20 is likewise increased by having less resistance in series with it and the shunt circuit through the resistance 26 opened at the contact 27. This gives a reversed condition of the fields 19 and 20 from what existed when the contacts 44 and 45 were opened. Thus the field coil 19 will be working below normal and the field coil 20 above normal, which will cause the armature of the dynamo 15 to reduce the strength of the field 11 below normal and the armature of the dynamo 16 to increase the strength of the field 12 above normal. The voltage of the armature of the dynamo 2 being in proportion to the strength of the field 11 will be below normal and receive current from the resistance 65, but the voltage of the armature of the dynamo 3 being in proportion to the strength of the field 12 will be above normal and supply current to the field coils of the generator which will cause the voltage of the generator armature circuit to rise and again open contacts 44 and 45 which will start another cycle of operations similar to the one just described.

If the current in the armature circuit of the generator increases more current will flow in the secondary of the transformer 56 and the coil 54 causing the latter to exert a greater pull on the lever 46, which will move the contact 45 toward the contact 44. There will be required a greater current in the coil 60 in order to separate the contacts 44 and 45. Therefore as the current in the coil 60 is in proportion to the voltage of the armature circuit the regulator will operate to maintain a higher voltage in the said armature circuit. The magnetic circuits of the coils 54 and 60 being remote from each other their operation will not be affected by the phase relation of the current and voltage in the generator armature circuit, therefore the voltage maintained in the said armature circuit will be in proportion to the current flowing therein.

In my invention as illustrated in Fig. 2, a direct current generator 67 is substituted for the alternator shown in Fig. 1, and means are provided for regulating the current in the field circuit in response to changes of current and voltage in the armature circuit. The exciter mains 6 and 7 being of the same voltage as the armature circuit of the generator 67 are connected in parallel therewith by means of the conductors 68 and 69 and the battery is omitted. One of the armatures of the three-wire exciter is omitted and the remaining armature 2′ is placed under the influence of both the field coils 11 and 12 which are wound so that their magnetic fields oppose each other, and means are provided for varying the relative strength of these fields whereby the armature is caused to generate a potential first in one direction and then in the other depending upon the relative strength of the fields 11 and 12. The potential produced by the field 11 is in a direction to cause a current to flow from conductor 8 to conductor 6 and that produced by the field 12 is in a direction to cause a current to flow from conductor 6 to conductor 8. The contact arm 44 is made stationary and the contact lever 46 is actuated by two cores controlled by the coils 54 and 60 so organized that any increase of current in the coil or solenoid 60 tends to open the contacts 44 and 45 and an increase of current in the coil or solenoid 54 tends to close said contacts. The solenoid 60 is connected in parallel with the armature mains 57 of the generator 67 so that the current flowing in the solenoid 60 will be in proportion to the voltage of the said armature circuit. The solenoid 54 is connected in parallel with a resistance 70 which is in series with one of the armature mains 57 so that the current flowing in the solenoid 54 will be in proportion to the current flowing in the armature circuit.

When the system shown in Fig. 2 is in operation current flows from one armature main 57, say the positive armature main, along the conductor 68 to the positive exciter main 6, thence through the regulating resistance 65, a conductor 71, the generator field coil 72, and a conductor 73 to the other armature main 57, namely, the negative armature main. The current flowing in this circuit controls the voltage of the armature circuit as described with reference to Fig. 1. When the voltage in the armature circuit drops below normal, the current in the solenoid 60 decreases and allows its core to drop and thereby bring the contacts 44 and 45 together thus short-circuiting and causing the demagnetization of the magnet 30, and this allows the spring 29 to pull the armature 28 against the contact 24 so that a part of the current which has been flowing through the field 11 will flow through the resistance 23, the armature lever 28 to the conductor 31'. But the circuit from the armature lever 28 to the conductor 7 by way of the resistance 26 being open at the contact 27, all of the current which flows from the conductor 6 to the armature lever 28 by way of the field coil 11 and resistance 23 will have to flow through the field coil 12 to conductor 7, thereby the field coil 12 becomes stronger than the field coil 11 and produces a potential in the armature of the dynamo 2 in the direction to cause current to flow from the conductor 6 to the conductor 71, thus a part of the current which has been flowing through the resistance 65 will flow through the armature 2', conductor 8 and the reaction coil 66 to conductor 71 which will decrease the amount of current flowing through the resistance 65 and thereby reduce the voltage drop across said resistance. The voltage of the armature 2' may rise sufficiently to cause current to flow through the resistance 65 in the reverse direction thereby causing the voltage across the field coils 72 to be greater than the voltage across the armature mains 57. Since however the resistance 65 and the field coil 72 are in series across a constant potential circuit, the sum of their voltages will always be equal to the voltage of the circuit and their voltages will vary inversely, that is, when the voltage across the resistance 65 decreases the voltage across the field coil 72 will increase, therefore the current flowing in the field coil will increase and the voltage in the armature circuit will rise. This increase of voltage in the armature circuit will cause more current to flow in the solenoid 60 causing it to lift its core and open the contacts 44 and 45. The current flowing from conductor 50 to conductor 49 will now flow through the magnet 30 and energizing it cause it to attract the armature lever 28 thereby breaking the circuit at the contact 24 and closing the circuit at the contact 27. This will cause more current to flow through the field coil 11 and less through the coil 12, which will make the armature 2' generate a potential in a direction to cause current to flow from the conductor 71 to the conductor 6. This will cause more current to flow through the resistance 65 which will increase the voltage drop across said resistance. But the sum of the voltages of the resistance 65 and the field coil 72 is constant, therefore an increase of voltage across the resistance 65 will cause the voltage of the field coil 62 to decrease which will decrease the current flowing in said field coil and cause the voltage of the armature to drop. If the current in the armature circuit increases there will be a greater drop of voltage across the resistance 70 thus causing more current to flow in the solenoid 54 which will tend to close the contacts 44 and 45. The regulator, will therefore operate to maintain a higher voltage in the armature mains in the same manner as described with reference to Fig. 1.

Another embodiment of the invention is illustrated in Fig. 3 which shows a rotary converter 74 connected, on the direct current side, to the mains 57, and on the alternating current side to a source 75 of electrical potential by means of conductors 76, 77 and 78. Fig. 3 also illustrates means for regulating the current in the field circuit in response to variations of the phase relation of the current and the voltage in the conductors 76, 77 and 78, thereby controlling the power factor.

The operation of the regulator as shown in Fig. 3 is the same as that of the system of Fig. 1, except that the armature lever 28 is connected through conductor 31, solenoid or coil 32, and conductor 34 directly to the common point of the fields 11 and 12 of the dynamos 2 and 3 and is placed in the magnetic fields of two electromagnets 30 and 30' which are energized by current flowing through contacts 79 and 80 respectively. A contact arm 81 is carried by the disk 36 and this disk is free to move in the magnetic field of magnets 82 and 83 about its shaft 37.

In the showing of Fig. 3 the magnets 33 and 40 bear the same relation to the disk 36 as the corresponding magnets do to the disk 36 shown in Fig. 1, the magnet 40 being permanently magnetized and the magnet 33 receiving its magnetism from the coil 32 which is in series with the armature lever 28. The coil 41 and its resistance 43 are for varying the lag of magnetism in the magnet 33 as described in connection with Fig. 1. A spring 84 opposes the movement of the arm 81 in the direction of the contact 80 and a spring 85 opposes the movement of the arm 81 in the direction of the contact 79. The magnets 82 and 83 are magnetized by coils 86 and 87 respectively, which coils are so connected to respective transformers 88 and 89 that the polar end 90 of the magnet 83 will always be like the polar end 91 of the magnet 82 when power is being delivered from the source 75 to the rotary 74, and like the polar end 92 of the magnet 82 when power is being delivered from the rotary 74 to the source 75 of potential. The current passing through the solenoids 86 and 87 is of alternating character, therefore the magnetic lines of force passing through the disk will be constantly changing. This will reduce eddy currents in the disk which will oppose the variations in the number of lines of force passing through the disk and maintain resultant poles on the disk after the magnetism in the magnets 82 and 83 has disappeared. There will be two of these resultant poles for each of the influencing poles 90, 91 and 92, that resultant pole on the side of the disk near the influencing pole being unlike and the one on the opposite side being like the influencing pole. A resistance 93 is interposed in one of the conductors 94 connecting the coil 87 with the secondary of the transformer 88, for the purpose of holding the current in the solenoid 87 in phase with the voltage supplied by the primary of the transformer 88. Now, if the current flowing in the conductor 76 is in phase with the voltage of the portion of the source 75 across which the primary of the transformer 88 is connected, the current in the coils 86 and 87 will be in phase and the magnetism in the magnets 82 and 83 will be simultaneous, therefore, there will be no tendency of the disk to rotate and the contact arm 81 will be held in a neutral position by the springs 84 and 85. No current will then pass through the magnets 30 and 30'. But if the field coil 72 of the rotary is not strong enough to hold the current in the leads 76, 77 and 78 in phase with the voltage, the current in the coil 86 will lag behind the current in the coil 87 and the magnet 82 will be magnetized after the magnetism has disappeared from the magnet 83, but a resultant pole will persist on the disk 36 opposite in sign to the pole 92, and being like the pole 91 and unlike the pole 92, it will be repelled by the pole 91 and attracted by the pole 92 thus causing the disk to rotate sufficiently to bring the contact 81 into engagement with the contact 80. Then current will flow by way of a conductor 95 to conductor 50 by contacts 81 and 80, thence through the coil 30' to conductor 7. The magnet 30' will become magnetized and attract the armature lever 28 and close the circuit at the contact 24 allowing current to pass from the contact 24 to the armature lever 28, conductor 31, coil 32 and conductor 34 to the common conductor of the fields 11 and 12. This current will magnetize the magnet 33 to the proper polarity to give the disk an impulse in the direction to separate the contacts 80 and 81 just sufficient to overcome the inertia of the moving element. At the same time this current will lower the voltage of the armature of the dynamo 2 and increase the voltage of the armature of the dynamo 3. This will increase the current in the field coil 72 as described with reference to Fig. 1, and will make the current in the conductor 76 lead so that the current in the coil 86 will be ahead of the current in the coil 87 and the magnet 83 will be magnetized after the magnetism has disappeared from the magnet 82. The resultant pole opposite the pole 91 will be like the pole 90 and the resultant pole opposite the pole 92 will be unlike the pole 90, therefore the disk will rotate and bring the contact 81 into engagement with the contact 79. Current will then flow from conductor 95 to conductor 49 and through the magnet 30 to conductor 7. The magnet 30 will attract the armature lever 28 and close the circuit to contact 27. This will allow current to pass from the common connection of the fields 11 and 12 to the conductor 34, solenoid or coil 32, conductor 31, armature lever 28, to the contact 27 and finally to the conductor 7. This current will magnetize the magnet 33 to the proper polarity to give the disk an impulse in the direction to separate the contacts 81 and 79 just sufficient to overcome the inertia of the moving element. The voltage of the armature of the dynamo 3 will now decrease and the voltage of the armature of the dynamo 2 will increase, thus decreasing the current in the field coil 72 and the current in the conductor 76 will again lag.

Another embodiment of the invention is illustrated in Fig. 4, which shows a rotary converter connected on the direct current side to mains 57 and on the alternating current side to conductors 76 and 78 and by them to a transformer 96 which is adapted to receive current from mains 97 and 98. Means controlled by the phase relation of the current and voltage in the conductors 76 and 78 are provided for cutting in and out a portion of the primary winding of the transformer 96 whereby the voltage supplied in the rotary converter is raised or lowered. And means controlled by the current and voltage of the mains 57 are provided for varying the strength of the field coil 72. This arrangement gives a reliable means for regulating the fluctuations in the voltage of a rotary converter which is impossible with the slow acting apparatus used for varying the voltage of the alternating current supplied to the rotary. The dynamos 2 and 3 may be omitted and the armature lever 28 is then connected directly to an intermediate point of the field circuit conductor 71 of the rotary. An automatic switch 99 which is pivoted at 100, is operated by cores 101 and 102 which are energized by solenoids 103 and 104 respectively. These solenoids receive current from the contacts 80 and 79 respectively when the torque of the disk 36 overcomes the spring 84 or 85 as the case may be, sufficiently to bring the contact 81 against one of the contacts 79 or 80. When the voltage of the mains 57 drops below normal the current in the solenoid 60 will decrease and allow its core to drop and close the contacts 44 and 45 and this will short circuit the magnet 30 and de-magnetize it thus allowing the spring 29 to pull the armature lever 28 away from the magnet 30. This will open the circuit at the contact 27 and bring the lever 28 into engagement with the contact 24. A part of the current which formerly flowed through the resistance 65 will now flow through the resistance 23 and therefore there will be less voltage drop across the resistance 65. Since the circuit is broken at the contact 27 all of the current flowing through the resistances 65 and 23 will have to flow through the field coil 72 and there will be a greater voltage drop across the field coil 72. This increase of voltage will cause more current to flow to the field coil 72 which will increase the voltage in the armature circuit, but it will also make the current lead the voltage in the leads 76 and 78. This will cause the disk 36 to rotate to bring the contact 81 in engagement with the contact 79 as described in connection with the system of Fig. 3. Current will then flow from the positive main 57 along the conductor 105 to another conductor 106 and through the solenoid 104 to a conductor 107, then through the contacts 79 and 81 to a conductor 108 and back to the negative main 57. This current passing through the solenoid 104 will attract the core 102 which will move the contact arm of the automatic switch 99 from one of a number of contacts 109 with which it then engages, say from an intermediate contact to the next adjacent one at the side thereof, thereby cutting out a portion of the primary winding of the transformer 96, the contact 109 being arranged to include a certain portion of the primary winding of the transformer. This will increase the voltage of the conductors 76 and 78 which will bring the current in these conductors again in phase with the voltage, and the spring 85 will move the contact 81 away from the contact 79 which will interrupt the current flowing through the solenoid 104 and allow the automatic switch 99 to come to rest. When the voltage rises in the mains 57 more current will flow through the solenoids 60 which will lift its core and separate the contacts 44 and 45 and allow current to flow through the magnet 30 and energize it thus attracting the armature lever 28 and thereby breaking the circuit at the contact 24 and closing the circuit at the contact 27. Then all the current in the field circuit will have to flow through the resistance 65 causing the voltage across the said resistance to decrease. But a part of the current flowing through the resistance 65 will flow through the resistance 66 instead of through the field coils 72 which will decrease the strength of current through the field coil and allow the voltage in the armature circuit to decrease. But a decrease of current in the field coil 72 will cause the current in the conductors 76 and 78 to lag behind the voltage, which will cause the disk 36 to rotate to bring the contact 81 against the contact 80. Current will then flow through the conductors 105 and 106, the solenoid 103, conductor 110, and contacts 80 and 81 to the conductor 108 and to the negative main 57. This current will cause the solenoid 103 to attract the core 101 and move the contact arm of the automatic switch 99 to the left and thereby cutting in more turns of the primary of the transformer 96 which will decrease the voltage of the conductors 76 and 78 until the current in the conductors is again in phase with the voltage, when the disk 36 will again take a neutral position and open the contact at 81 and 80 and allow the switch 99 to come to rest. The coil 54 opposes the operation of the coil 60 to compensate for changes of load on the mains 57 as described with reference to Fig. 2.

The regulator herein described operates without attention to control the electric condition of the circuit to which it is connected, and is extremely sensitive, reducing the variations to the narrowest limit.

While the invention has been described with considerable detail it is to be understood that the invention is by no means limited to the particular arrangement shown for the invention is capable of other modifications than those shown and described while still retaining the salient points of the invention.

A practical example of the system shown in Fig. 2 is here given without, however, in any manner confining the invention to the figures noted. If the generator 1 is a 5000 K. W. machine, the resistance 66 will have a carrying capacity of about 300 amperes, and the dynamos 2 and 3 will each have a carrying capacity of about 300 amperes with a combined voltage equal to the voltage of the battery. The dynamos 15 and 16 will have a carrying capacity of about 5 amperes with a combined voltage equal to that of the battery. The resistances 23 and 26 will have a carrying capacity of about one ampere. The magnet 30 is of sufficient strength to cause contact at the terminals 24 and 27. The resistance 52 is about 100 ohms so that about one ampere will pass through it when the coil 30 is short circuited. The disk 36 and its controlling magnets are about the size of similar parts of other electrical instruments and the transformers 56 and 58 are each of about 100 watts capacity.

What is claimed is:—

1. In an electric system a dynamo-electric machine having an armature circuit and a field circuit, means capable of supplying two electromotive forces connected to three points of the field circuit and means controlled by the electrical condition of the armature circuit of the dynamo-electric machine for controlling said electromotive forces.

2. The combination of a dynamo-electric machine two sources of current connected in series, each being connected in parallel with a different part of the field circuit of said dynamo-electric machine, a plurality of electromagnets operatively mounted in the field circuit, and means controlled by said plurality of magnets for varying the relative voltage of said sources whereby each source is caused to furnish current to or receive current from the portion of the field circuit to which it is connected depending upon the voltage of said source relative to the voltage of said portion of the field circuit to which it is connected.

3. In an electric system a generator having an armature circuit and a field circuit, means capable of supplying two electromotive forces connected to three points of said field circuit, means controlled by the electrical condition of the armature circuit of the generator for controlling the said electromotive forces and means for compensating for the inertia of said last named means.

4. In an electric system a dynamo-electric machine having an armature circuit and a field circuit, means capable of supplying two electromotive forces connected to three points of the field circuit, and means controlled by the electrical condition of the armature circuit of the dynamo-electric machine for varying one of said electromotive forces inversely as the other of said electromotive forces allowing the sum of said electromotive forces to remain constant.

5. In an electric system, a generator having an armature circuit and a field circuit, two dynamos each in parallel with a different portion of said field circuit and means controlled by a plurality of magnets, one of which is energized by said armature circuit, for causing each dynamo to receive current from or deliver current to the portion of said field circuit to which it is connected depending upon the electrical condition of the armature circuit to be controlled.

6. In an electric system a dynamo-electric machine having a field coil and a resistance in series therewith, means for supplying current to the field coil and resistance and means controlled by the electrical condition of the armature circuit of said dynamo-electric machine for varying the voltage drop across the field coil inversely as the voltage drop across the resistance without varying the resistance in series with the field coil.

7. In an electric system, a generator having a field circuit, a source of electromotive force in parallel with a portion of said field circuit, and means controlled by the electric condition of the armature circuit of said generator for varying the electromotive force of said source.

8. In an electric system, a generator having an armature circuit and a field circuit and two dynamos each in parallel with a different portion of said field circuit, and means controlled by the electrical condition of said armature circuit for causing each dynamo to receive current from or deliver current to the portion of said field circuit to which it is connected depending upon the electrical condition of the armature circuit to be controlled.

9. In an electric system, a generator having a field circuit and an armature circuit, a source of electromotive force in parallel with a portion of said field circuit, means controlled by the electric condition of the armature circuit of said generator for varying the electromotive force of said source, and means for compensating for the inertia of said means.

10. In an electric system, a dynamo-electric machine having a field coil and a resistance in series, a conductor connected to a point between the field coil and the resistance, means for supplying current to the conductor and means controlled by the current in the armature circuit of said dynamo-electric machine for varying the current in said conductor.

11. In an electric system, a generator having an armature circuit and a field circuit, a source of electrical potential in parallel with a portion of the field circuit, a control circuit for said source, and means controlled both by the electrical condition of the armature circuit and by said control circuit for varying the potential of said source whereby the voltage of said portion is varied.

12. In an electric system, a dynamo electric machine having a field coil, a resistance in series with said field coil, a source of electromotive force in parallel with said field coil, and means controlled by the electric condition of the armature circuit of said dynamo electric machine for varying the electromotive force of said source.

13. In an electric system, a dynamo electric machine having a field coil, a resistance in series with said field coil, a source of electromotive force in parallel with said field coil, means controlled by the electric condition of the armature circuit of said dynamo electric machine for varying the electromotive force of said source and means for compensating for the inertia of said first named means.

14. In an electric system, a dynamo-electric machine having a field coil and a resistance in series therewith and means controlled by the electrical condition of the armature circuit of said dynamo electric machine for diverting current away from the resistance to the field coil when the electric condition of the armature circuit is beyond normal in one direction and from the field coil to the resistance when the electrical condition of the armature circuit is beyond normal in the other direction.

15. The combination of a dynamo-electric machine, two sources of electromotive force connected in series, an electric circuit whose current value varies through zero, and means controlled both by said electric circuit and by the electrical condition of the armature circuit of said dynamo-electric machine for controlling the voltage of said sources.

16. The combination of a dynamo-electric machine, two sources of current connected in series, each being connected in parallel with a different part of the field circuit of said dynamo-electric machine, means controlled by the electrical condition of the armature circuit of said dynamo-electric machine for varying the relative voltage of said sources whereby each source is caused to furnish current to or receive current from the portion of the field circuit to which it is connected depending upon the voltage of said source relative to the voltage of said portion of the field circuit to which it is connected, and means for compensating for the inertia of said first named means.

17. The combination of a dynamo-electric machine, two sources of current connected in series, each being connected in parallel with a different part of the field circuit of said dynamo-electric machine, and means controlled by the electrical condition of the armature circuit of said dynamo-electric machine for varying the relative voltage of said sources whereby each source is caused to furnish current to or receive current from the portion of the field circuit to which it is connected depending upon the voltage of said source relative to the voltage of said portion of the field circuit to which it is connected.

18. In an electric system, a dynamo-electric machine having a field circuit composed of a field coil and a resistance in series, an exciter for the field circuit, a conductor connecting the armature circuit of the exciter with a point in said field circuit between the field coil and the resistance, an exciter for said first named exciter and means for controlling the voltage of said last named exciter.

19. In an electric system, a dynamo-electric machine having a field circuit composed of a field coil and a resistance in series, an exciter for the field circuit, a conductor connecting the armature circuit of the exciter with a point in said field circuit between the field coil and the resistance, an exciter for said first named exciter and means controlled by the electrical condition of the armature circuit of said dynamo-electric machine for controlling the voltage of said last named exciter.

In testimony that I claim the foregoing as my own, I have hereto affixed my signature in the presence of two witnesses.

FORREST E. RICKETTS.

Witnesses:
JOHN T. FARDY,
STEPHEN D. BROADBENT.